United States Patent
Baran et al.

(10) Patent No.: US 9,067,782 B2
(45) Date of Patent: Jun. 30, 2015

(54) INORGANIC PIGMENT COMPOSITIONS COMPRISING SURFACE-MODIFIED NANOPARTICLES, AND METHODS OF MAKING

(75) Inventors: Jimmie R. Baran, Prescott, WI (US); Madeline P. Shinbach, St. Paul, MN (US); Haeen Sykora, New Richmond, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 555 days.

(21) Appl. No.: 13/510,122

(22) PCT Filed: Nov. 19, 2010

(86) PCT No.: PCT/US2010/057407
§ 371 (c)(1),
(2), (4) Date: May 16, 2012

(87) PCT Pub. No.: WO2011/063222
PCT Pub. Date: May 26, 2011

(65) Prior Publication Data
US 2012/0266781 A1 Oct. 25, 2012

Related U.S. Application Data

(60) Provisional application No. 61/262,933, filed on Nov. 20, 2009.

(51) Int. Cl.
| | | |
|---|---|---|
| *C09D 1/00* | (2006.01) | |
| *B82Y 30/00* | (2011.01) | |
| *C09B 63/00* | (2006.01) | |
| *C09C 1/00* | (2006.01) | |
| *C09C 1/24* | (2006.01) | |
| *C09C 1/26* | (2006.01) | |
| *C09C 1/30* | (2006.01) | |
| *C08K 3/22* | (2006.01) | |
| *D21H 17/69* | (2006.01) | |
| *D21H 19/38* | (2006.01) | |

(52) U.S. Cl.
CPC ............ *B82Y 30/00* (2013.01); *C01P 2006/62* (2013.01); *C09B 63/00* (2013.01); *C09C 1/0081* (2013.01); *C09C 1/24* (2013.01); *C09C 1/26* (2013.01); *C09C 1/3081* (2013.01); *D21H 17/69* (2013.01); *D21H 19/38* (2013.01); *D21H 19/385* (2013.01); *C01P 2004/64* (2013.01)

(58) Field of Classification Search
CPC .... C01P 2004/62; C01P 2004/64; C08J 3/12; B82Y 5/00
USPC .......... 106/401, 436, 446, 475, 316; 424/490; 977/773; 556/457; 42/402
See application file for complete search history.

(56) References Cited

U.S. PATENT DOCUMENTS

| | | |
|---|---|---|
| 4,299,635 A | 11/1981 | Dickerson |
| 6,586,483 B2 | 7/2003 | Kolb |
| 2008/0286362 A1 | 11/2008 | Baran |
| 2011/0257054 A1 | 10/2011 | Baran |
| 2011/0257055 A1 | 10/2011 | Baran |
| 2012/0100373 A1 | 4/2012 | Shinbach |

FOREIGN PATENT DOCUMENTS

| | | |
|---|---|---|
| JP | H07-238233 A | 9/1995 |
| JP | 08-113728 | 5/1996 |
| JP | H09-132514 A | 5/1997 |
| JP | 3-045660 | 3/2000 |
| JP | 2003-327867 A | 11/2003 |
| JP | 2003-342021 A | 12/2003 |
| JP | 2004-244599 A | 9/2004 |
| JP | 2008-94788 | 4/2008 |
| JP | 2009-110022 | 5/2009 |

*Primary Examiner* — Pegah Parvini
(74) *Attorney, Agent, or Firm* — Kenneth B. Wood

(57) ABSTRACT

Inorganic pigment compositions comprising surface-modified nanoparticles are described, along with methods of making such compositions. Such compositions may allow the inorganic pigment to be diluted to a significant extent with non-pigmented extenders, while preserving or enhancing the coloring power of the pigment.

17 Claims, No Drawings

INORGANIC PIGMENT COMPOSITIONS COMPRISING SURFACE-MODIFIED NANOPARTICLES, AND METHODS OF MAKING

CROSS REFERENCE TO RELATED APPLICATIONS

This application is a national stage filing under 35 U.S.C. 371 of PCT/US2010/057407, filed Nov. 19, 2010, which claims priority to U.S. Provisional Application No. 61/262,933, filed Nov. 20, 2009, the disclosure of which is incorporated by reference in its/their entirety herein.

BACKGROUND

Inorganic pigments have been known for centuries, and have found use in enhancing the color of paints, coatings, ceramic and clay articles, molded plastic resins, and the like.

SUMMARY

Inorganic pigment compositions comprising surface-modified nanoparticles are described, along with methods of making such compositions. Such compositions may allow the inorganic pigment to be diluted to a significant extent with non-pigmented extenders, while preserving or enhancing the coloring power of the pigment.

In one aspect, disclosed herein is a method of preparing a nanoparticle-enhanced inorganic pigment composition, comprising: providing a plurality of inorganic pigment particles; and, mixing the plurality of inorganic pigment particles with a plurality of surface-modified nanoparticles so that the plurality of surface-modified nanoparticles forms at least a monolayer upon at least a portion of the surface of at least some of the inorganic pigment particles.

In another aspect, disclosed herein is a nanoparticle-enhanced inorganic pigment composition, comprising: a plurality of inorganic pigment particles; and, a plurality of surface-modified nanoparticles forming at least a monolayer upon at least a portion of the surface of at least some of the inorganic pigment particles.

DETAILED DESCRIPTION

Described herein are inorganic pigment compositions comprising surface-modified nanoparticles, along with methods of making such compositions. As used herein, the term inorganic pigment denotes any inorganic particulate material that may be used to impart a significant color or hue to a composition in which the pigment is present. In the present context, pigments are defined herein as those substances that predominately impart a color other than white (e.g., that may impart a yellow, orange, red, green, blue, violet, black, etc. color), and do not include substances that impart a predominately white color (e.g., substances such as zinc oxide, titanium dioxide, barium sulfate, calcium carbonate, and the like). A large number of naturally derived and synthetically produced inorganic colored pigments are known, and may be known by their specific chemical name and/or by their colloquial name. Examples of inorganic pigments include ferric ferrocyanide (commonly known as prussian blue), zinc ferrite, chromium oxide, chromium yellow, zinc yellow, cadmium yellow, yellow iron oxide, mineral fast yellow, nickel-titanium yellow, raw umber, raw sienna, chromium orange, molybdenum orange, red iron oxide, cadmium red, red lead, mercury sulfide, cadmium permanent red 4R, cadmium sulfide, cadmium selenide, manganese violet, cobalt blue, cobalt stannate, potassium cobaltinitrite, calcium copper silicate, copper acetoarsenite, copper arsenite, barium copper silicate, lead chromate, lead oxide, chromium green, chromium oxide, iron oxide yellow, iron oxide red, arsenic sulfide, zinc sulfide, stannic sulfide, and the like. In this context, the term inorganic pigments encompasses certain pigments that contain carbon, e.g. carbon present in cyano groups, as exemplified by ferric ferrocyanide, while excluding organic pigments such as those based on azo compounds and the like. Those of ordinary skill in the art will recognize many other inorganic pigments as also being suitable. Such inorganic pigments may be chosen, for example, from the pigments listed under "Chemical Type" as inorganic, in the NPIRI Raw Material Data Handbook, Volume 4—Pigments, published by the National Printing Ink Research Institute. Combinations of any or all of these inorganic pigments may be used.

The methods and compositions disclosed herein may be used to advantage in any pigment of any shade. However, results may be most striking for relatively dark-colored pigments (e.g., blue, purple, and the like).

As used herein, the term "nanoparticles" signifies particles with an average primary particle size of less than 100 nanometers and in which the primary particles are not present in the form of agglomerates that cannot be straightforwardly de-agglomerated to provide primary particles of the above-listed size. "Average primary particle size" refers to the average diameter obtained from measurements of multiple individual (non-agglomerated) particles. Nanoparticle size measurements can be performed, e.g., by transmission electron microscopy. In the case of nanoparticles that deviate from substantially spherical in shape, those of ordinary skill in the art will recognize the particle size to refer to an effective particle size (of a sphere of the same volume as the actual particle). In some embodiments, the nanoparticles have an average particle size of less than about 40 nanometers, about 20 nanometers, or about 10 nanometers. In further embodiments, the nanoparticles have an average primary or agglomerate particle size diameter of at least 1, 2 or 3 nanometers.

In this context, "nanoparticles" as defined herein will be distinguished from materials such as fumed silica, pyrogenic silica, precipitated silica, etc. Such silica materials are known to those of ordinary skill in the art as being comprised of primary particles that are essentially irreversibly bonded together in the form of aggregates which, have an average size greater than 100 nm (e.g., typically of at least 200 nanometers) and from which it is not possible to straightforwardly extract individual primary particles.

In some embodiments, the nanoparticles used herein are inorganic nanoparticles. That is, although certain (e.g. crosslinked) organic materials may have sufficient hardness and durability to be used if desired, in some embodiments the nanoparticles comprise an inorganic material. Exemplary inorganic materials that may be available in nanoparticulate form include for example metal phosphates, sulfonates and carbonates (e.g., calcium carbonate, calcium phosphate, hydroxy-apatite); oxides, e.g. metal oxides (e.g., zirconia, titania, silica, ceria, alumina, iron oxide, vanadia, zinc oxide, antimony oxide, tin oxide, and alumina-silica), and metals (e.g., gold, silver, or other precious metals). Nanoparticles, e.g. silica nanoparticles, may be obtained from commercial sources, e.g. from Nalco Co, Napervillle, Ill. Nanoparticles can also be made using techniques known in the art. For example, zirconia nanoparticles can be prepared using hydrothermal technology, as described for example in PCT application US2008/087385.

In some embodiments, nanoparticles may be obtained in the form of a colloidal dispersion. For example, colloidal silica dispersions are available from Nalco Co. under the trade designations "NALCO 1040," "NALCO 1050," "NALCO 1060," "NALCO 2326", "NALCO 2327," and "NALCO 2329". Zirconia nanoparticle dispersions are available from Nalco Chemical Co. under the trade designation "NALCO OOSSOO8" and from Buhler AG Uzwil, Switzerland under the trade designation "Buhler zirconia Z-WO". Some colloidal dispersions can be dried to provide dry nanoparticles if desired for particular purposes.

The nanoparticles may be fully condensed. Fully condensed nanoparticles (with the exception of silica) typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

In some embodiments the nanoparticles are surface modified so as to contain at least some organic (e.g., hydrocarbon) groups on their surface. In general, a surface modification agent has a first end that will attach to the nanoparticle surface (covalently, ionically or through strong physisorption) and a second (e.g., organic) end that enhances the ability of the nanoparticles to resist agglomerating such as permanently fusing together. The inclusion of surface modification can also improve the compatibility of the nanoparticles with other materials. For example, an organic end group such as the organic group of an organosilane can improve the compatibility of the nanoparticles with organic matrix material such as polymerizable and thermoplastic resins. It has been surprisingly found that nanoparticles modified with organic groups can be added to an inorganic pigment such that the nanoparticle-enhanced inorganic pigment displays enhanced pigmenting power, as disclosed herein, even though the surface-modified nanoparticles comprise a generally organic surface rather than an inorganic surface.

Examples of surface modification (treatment) agents include alcohols, amines, carboxylic acids, sulfonic acids, phosphonic acids, silanes and titanates. The preferred type of treatment agent is determined, in part, by the chemical nature of the (e.g. metal oxide) nanoparticle surface. Silanes may be preferred for silica and for other siliceous fillers. Silanes and carboxylic acids may be preferred for metal oxides such as zirconia.

Exemplary silanes include, but are not limited to, alkyltrialkoxysilanes such as n-octyltrimethoxysilane, n-octyltriethoxysilane, isooctyltrimethoxysilane, dodecyl trimethoxysilane, octadecyltrimethoxysilane, propyltrimethoxysilane, and hexyltrimethoxysilane; methacryloxyalkyltrialkoxysilanes or acryloxyalkyltrialkoxysilanes such as 3-methacryloxypropyltrimethoxysilane, 3-acryloxypropyltrimethoxysilane, and 3-(methacryloxy)propyltriethoxysilane; methacryloxyalkylalkyldialkoxysilanes or acryloxyalkylalkyldialkoxysilanes such as 3-(methacryloxy)propylmethyldimethoxysilane, and 3-(acryloxypropyl)methyldimethoxysilane; methacryloxyalkyldialkylalkoxysilanes or acyrloxyalkyldialkylalkoxysilanes such as 3-(methacryloxy)propyldimethylethoxysilane; mercaptoalkyltrialkoxylsilanes such as 3-mercaptopropyltrimethoxysilane; aryltrialkoxysilanes such as styryltrimethoxysilane, phenyltrimethoxysilane, phenyltriethoxysilane, and p-tolyltriethoxysilane; vinyl silanes such as vinylmethyldiacetoxysilane, vinyldimethylethoxysilane, vinylmethyldiethoxysilane, vinyltrimethoxysilane, vinyltriethoxysilane, vinyltriacetoxysilane, vinyltriisopropoxysilane, vinyltrimethoxysilane, vinyltriphenoxysilane, vinyltri-t-butoxysilane, vinyltris(isobutoxy)silane, vinyltriisopropenoxysilane, and vinyltris(2-methoxyethoxy)silane; 3-glycidoxypropyltrialkoxysilane such as glycidoxypropyltrimethoxysilane; polyether silanes such as N-(3-triethoxysilylpropyl)methoxyethoxyethoxyethyl carbamate (PEG3TES), N-(3-triethoxysilylpropyl) methoxyethoxyethoxyethyl carbamate (PEG2TES), and SILQUEST A-1230; and combinations thereof.

In some embodiments, the surface modification agent is a carboxylic acid and/or anion thereof that can impart a polar character to (e.g., zirconia-containing) nanoparticles.

For example, the surface modification agent may comprise a volatile acid, i.e., monocarboxylic acids having six or less carbon atoms, such as acrylic acid, methacrylic acid, acetic acid, and mixtures thereof. Of these, acetic acid is non-reactive with the organic component; whereas acrylic acid and methacrylic acid are reactive volatile resins since the (meth)acrylate groups of these acids can copolymerize with the (meth)acrylate groups of the monomers of the organic components.

As another example, the surface modification agent can be a carboxylic acid and/or anion thereof having a polyalkylene oxide group. In some embodiments, the carboxylic acid surface modification agent is of the following formula.

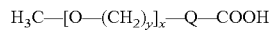

In this formula, Q is a divalent organic linking group, x is an integer in the range of 1 to 10, and y is an integer in the range of 1 to 4. The group Q is often an alkylene group, alkenylene group, arylene, oxy, thio, carbonyloxy, carbonylimino, or a combination thereof. Representative examples of this formula include, but are not limited to, 2-[2-(2-methoxyethoxy)ethoxy] acetic acid (MEEAA) and 2-(2-methoxyethoxy)acetic acid (MEAA). Other representative examples are the reaction product of an aliphatic or aromatic anhydride and a polyalkylene oxide mono-ether such as succinic acid mono-[2-(2-methoxy-ethoxy)-ethyl] ester, maleic acid mono-[2-(2-methoxy-ethoxy)-ethyl] ester, and glutaric acid mono-[2-(2-methoxy-ethoxy)-ethyl] ester.

Still other carboxylic acid surface modifying agents are the reaction product of phthalic anhydride with an organic compound having a hydroxyl group. Suitable examples include, for example, phthalic acid mono-(2-phenylsulfanyl-ethyl) ester, phthalic acid mono-(2-phenoxy-ethyl) ester, or phthalic acid mono-[2-(2-methoxy-ethoxy)-ethyl] ester. In some examples, the organic compound having a hydroxyl group is a hydroxyl alkyl (meth)acrylate such as hydroxyethyl (meth)acrylate, hydroxypropyl (meth)acrylate, or hydroxylbutyl (meth)acrylate. Examples include, but are not limited to, succinic acid mono-(2-acryloyloxy-ethyl) ester, maleic acid mono-(2-acryloyloxy-ethyl) ester, glutaric acid mono-(2-acryloyloxy-ethyl) ester, phthalic acid mono-(2-acryloyloxy-ethyl) ester, and phthalic acid mono-(2-acryloyl-butyl) ester. Still others include mono-(meth)acryloxy polyethylene glycol succinate and the analogous materials made from maleic anhydride glutaric anhydride, and phthalic anhydride. In another example, the surface modification agent is the reaction product of polycaprolactone and succinic anhydride.

In some embodiments, the surface modification agent contains one or more linking groups (by way of which the agent can be covalently coupled to the surface of a nanoparticle) and one or more hydrocarbon groups (e.g., alkyl, phenyl, etc.). Such groups can impart a generally nonpolar organic character to the nanoparticles. Examples of such surface modification agents include e.g. isooctyltrimethoxy silane and methyltrimethoxy silane.

Various other surface treatments are known in the art, such as described in WO2007/019229; incorporated herein by reference.

In order to perform the surface modification, the nanoparticles are typically combined with the surface modification agent, e.g., in a liquid that may act e.g. to disperse or suspend the nanoparticles and/or to disperse, suspend or dissolve the surface modification agent. The amount of surface modifier to be used may depend upon several factors such as nanoparticle size, nanoparticle type, molecular weight of the surface modifier, and modifier type. In general, it may be preferred that approximately a monolayer of modifier is attached to the surface of the nanoparticle. The attachment procedure or reaction condition may also depend on the surface modifier used. For silanes it is preferred to surface treat at elevated temperatures under acidic or basic conditions for about 1-24 hours. Surface treatment agents such as carboxylic acids may not require elevated temperatures or extended time.

The surface modification of nanoparticles e.g. in a colloidal dispersion can be accomplished in a variety of ways. The process may involves the mixing of an inorganic dispersion with one or more surface modifying agents. Optionally, a co-solvent can be added, such as for example, 1-methoxy-2-propanol, methanol, ethanol, isopropanol, ethylene glycol, N,N-dimethylacetamide, 1-methyl-2-pyrrolidinone, and mixtures thereof. The co-solvent can enhance the solubility of the surface modifying agents as well as the dispersibility of the surface modified nanoparticles. The mixture comprising the colloidal dispersion and surface modifying agents may be subsequently reacted at room or an elevated temperature, with or without mixing.

Methods of surface-modifying nanoparticles are described in further detail e.g. in U.S. Pat. No. 6,586,483, and in U.S. patent application Ser. No. 61/220,698, entitled "Method of Milling Particles with Nanoparticles and Milled Free-flowing Powder", which is incorporated by reference in its entirety herein for this purpose.

In various embodiments, surface-modified nanoparticles resulting from the above-described surface modification may be provided as dry particles, or as a suspension or dispersion in a liquid. In whatever form obtained, they may be combined with inorganic pigments to form a nanoparticle-enhanced inorganic pigment composition as disclosed herein.

In some embodiments, the surface-modified nanoparticles may be combined with the inorganic pigment particles by wet blending. In this method, the surface-modified nanoparticles and the inorganic pigment particles may be combined in a liquid or liquid mixture. Typical liquids that may be employed include, for example, toluene, isopropanol, heptane, hexane, octane, and/or water. The liquid containing the surface-modified nanoparticles and inorganic pigment particles may be stirred, agitated, etc. with apparatus familiar to those of ordinary skill in the art. If desired, after the combination is complete the liquid may be removed (e.g. by filtration, evaporation, freeze-drying, etc.) to provide the nanoparticle-enhanced inorganic pigment composition in dry form. Or, particularly if the liquid is compatible with a particular vehicle into which it is desired to include the nanoparticle-enhanced inorganic pigment composition, the liquid may remain rather than being removed.

In various embodiments, the surface-modified nanoparticles may be present at less than 4 wt. %, less than 2 wt. %, or less than 1 wt. %, relative to the inorganic pigment particles. In additional embodiments, the surface-modified nanoparticles may be present at least at 0.2 wt. %, at least at 0.4 wt. %, or at least at 0.6 wt. %, relative to the inorganic pigment particles.

However achieved, it may be optimum for some or all of the inorganic pigment particles to be provided with surface-modified nanoparticles in proximity to, and/or associated with, the outer surface of the inorganic pigment particle. In some embodiments, the surface-modified nanoparticles are distributed so as to form at least a surface monolayer upon at least a portion of the surface of at least some of the inorganic pigment nanoparticles. Those of ordinary skill in the art will appreciate that even if surface-modified nanoparticles may be present in a composition that also contains pigment, such distribution may not occur, absent the use of the methods disclosed herein.

In various embodiments, the surface-modified nanoparticles may be bonded (e.g., covalently bonded) to the pigment particles. In other embodiments, the surface-modified nanoparticles may not be covalently bonded to the pigment particles.

It has been found that the nanoparticle-enhanced inorganic pigment compositions may provide advantageous color-imparting properties in comparison to the inorganic pigment without surface-modified nanoparticles. Without being limited by theory or mechanism, it may be that surface-modified nanoparticles may assist in more effectively causing agglomerates of pigment particles to be de-agglomerated into nonagglomerated pigment particles, may assist in more effectively dispersing pigment particles amongst extender particles, and/or may assist in more effectively dispersing pigment particles within an organic vehicle. Such effects may be visible upon inspection of the nanoparticle-enhanced inorganic pigment composition. Such effects may also, or instead, be visible upon combining the nanoparticle-enhanced inorganic pigment composition with an extender, as demonstrated in Tables 1, 2 and 3. For example, such effects may allow the achieving of similar color properties even at a much lower amount of pigment relative to extender, e.g. as may be seen in comparing Example 2-3 to Example 2-1 in Table 2. Or, such effects may allow the achieving of e.g. richer color properties at a given amount of pigment relative to extender, e.g. as may be seen in comparing Example 2-2 to Example 2-1 in Table 2. Such effects may also, or instead, be visible upon including the nanoparticle-enhanced inorganic pigment composition into a vehicle (e.g., paint, and the like), as demonstrated in Example 5.

It has been further, and surprisingly, found that surface-modified nanoparticles may provide the above-described enhancements in the color-imparting properties of inorganic pigments even though the surface-modified nanoparticles may comprise generally organic surface groups. These results are particularly surprising in view of the fact that nanoparticles that are surface-modified to comprise generally organic surface groups have not been found to achieve similar enhancement in the color-imparting properties of organic pigments, as demonstrated in Example 6.

It has been still further, and surprisingly, found that the above-mentioned enhancements in visual and/or optical properties may be present even though the inorganic pigment particles when combined with nanoparticles as disclosed herein may not necessarily exhibit any improvement in flow properties, and may even exhibit poorer flow properties (e.g., increased tendency to cake or clump), in comparison to inorganic pigment particles without nanoparticles. This is surprising since it has been thought that improvements in such flow properties was likely to be associated with, or in fact to be the cause of, any improvements in pigment dispersion and resulting enhancement in the color-imparting properties of the pigment.

Nanoparticle-enhanced pigment compositions as disclosed herein may be particularly advantageously used in combination with extenders. In this context, the term extender is used to denote any inorganic particulate additive that does not impart a significant (non-white) color or hue. Thus, in this context, the term extender encompasses such (white) materials as titanium dioxide, barium sulfate, etc., that are occasionally referred to as pigments. Materials that may function as an extender in the present application may thus be chosen from any white, translucent, semi-transparent, etc., inorganic filler. Suitable extenders may include e.g. any of the well-known inorganic fillers such as silicates and/or aluminosilicates (e.g., talc, clay, mica, and sericite), calcium carbonate, nepheline (available, for example, under the trade designation "MINEX" from Unimin Corp, New Canaan, Conn.), feldspar, wollastonite, kaolinite and the like. Suitable extenders may further include e.g. titanium dioxide, barium sulfate, zinc oxide, calcium carbonate, dicalcium phosphate, diatomaceous earth, and the like.

Suitable extenders may further include e.g. glass bubbles and/or ceramic microparticles (e.g., beads, microspheres and the like). Exemplary ceramics include aluminates, titanates, zirconates, silicates, doped (e.g., lanthanides, and actinide). Ceramic microparticles can be made using techniques known in the art and/or are commercially available. Examples of commercially available glass bubbles include those marketed by 3M Company, St. Paul, Minn., under the designation "3M SCOTCHLITE GLASS BUBBLES" (e.g., grades K1, K15, S15, S22, K20, K25, S32, K37, S38, K46, S60/10000, S60HS, A16/500, A20/1000, A20/1000, A20/1000, A20/1000, H50/10000 EPX, and H50/10000 (acid washed)); glass bubbles marketed by Potter Industries, Valley Forge, Pa., under the trade designation "SPHERICEL" (e.g., grades 110P8 and 60P18), "LUXSIL", and "Q-CEL" (e.g., grades 30, 6014, 6019, 6028, 6036, 6042, 6048, 5019, 5023, and 5028); hollow glass microspheres marketed under the trade designation "DICAPERL" by Grefco Minerals, Bala Cynwyd, Pa., (e.g., grades HP-820, HP-720, HP-520, HP-220, HP-120, HP-900, HP-920, CS-10-400, CS-10-200, CS-10-125, CSM-10-300, and CSM-10-150); and hollow glass particles marketed by Silbrico Corp., Hodgkins, Ill., under the trade designation "SIL-CELL" (e.g., grades SIL 35/34, SIL-32, SIL-42, and SIL-43). Commercially available ceramic microspheres include ceramic hollow microspheres marketed by SphereOne, Inc., Silver Plume, Colo., under the trade designation, "EXTENDOSPHERES" (e.g., grades SG, CG, TG, SF-10, SF-12, SF-14, SLG, SL-90, SL-150, and XOL-200); and ceramic microspheres marketed by 3M Company under the trade designation "3M CERAMIC MICROSPHERES" (e.g., grades G-200, G-400, G-600, G-800, G-850, W-210, W-410, and W-610). Any or all of the above-listed extenders may be used in combination.

The nanoparticle-enhanced inorganic pigment composition may be added directly to a vehicle, e.g. a vehicle containing one or more extenders, as described below. However, in some embodiments one or more extenders may be combined with the nanoparticle-enhanced inorganic pigment composition to provide an admixture that may be then added to a vehicle. Accordingly, in various embodiments the nanoparticle-enhanced inorganic pigment composition may be combined with one or more extenders, at a weight ratio of extender to nanoparticle-enhanced inorganic pigment composition of at least 2:1, at least 4:1, or at least 8:1. In further embodiments, the extender is present at a weight ratio to the nanoparticle-enhanced inorganic pigment composition of at most 20:1, at most 15:1, or at most 12:1. An admixture thus diluted with extender may exhibit the advantageous properties described previously herein; e.g., an admixture e.g. containing only about 10% by weight inorganic pigment, but with the inorganic pigment being enhanced by the presence of surface-modified nanoparticles, may display similar visually perceived color characteristics to the undiluted inorganic pigment in the absence of the enhancing nanoparticles.

Nanoparticle-enhanced inorganic pigment compositions as disclosed herein may be used to advantage in any vehicle (by which is generically meant any carrier, resin, material, matrix, syrup, varnish, paint, shellac, coating, adhesive, binder, etc.) into which the pigment may be included to provide a significant color. In some embodiments, the nanoparticle-enhanced inorganic pigment composition may be added to a vehicle that already comprises extender (e.g., added to an existing paint). In other embodiments, the nanoparticle-enhanced inorganic pigment composition may be mixed with extender to form a nanoparticle-enhanced inorganic pigment/extender admixture as described above, then added to a vehicle.

Vehicles as disclosed herein may be applied to the surface of an item (e.g., as a paint or varnish), may be directly formed into shapes (e.g., molded, formed into particles (e.g., roofing granules)), and so on.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather by the structures described by the language of the claims, and the equivalents of those structures. To the extent that there is a conflict or discrepancy between this specification and the disclosure in any document incorporated by reference herein, this specification will control.

EXAMPLES

All parts, percentages, and ratios in the examples and the rest of the specification are based on weight, unless noted otherwise. Solvents and other reagents used were obtained from Sigma-Aldrich Chemical Company (Milwaukee, Wis.) unless otherwise noted.

Silica nanoparticles (16.6% solids in water) were obtained from Nalco Company, Naperville, Ill. under the trade designation NALCO 2326. These nanoparticles were reported by the supplier as having an average particle size of approximately 5 nm and were not reported by the supplier to be surface modified. Silica nanoparticles (41.45% solids in water) were obtained from Nalco Company under the trade designation NALCO 2327. These nanoparticles were reported by the supplier as having an average particle size of approximately 20 nm.

Fumed silica was obtained under the trade designation Cab-O-Sil CT-1221 from Cabot Corporation, Billerica, Mass.

Iron oxide (red) inorganic pigment was obtained from Brenntag Specialties, South Plainfield, N.J., under the trade designation WCD Red. Ferric ferrocyanide (blue) inorganic pigment was obtained from Brenntag Specialties under the trade designation WCD Blue. Iron oxide (red) inorganic pigment was also obtained from the 3M Industrial Minerals Products Division, St. Paul, Minn., and is believed to be similar to, or equivalent to, WCD Red.

Organic pigment was obtained from Sun Chemical, Cincinnati, Ohio, under the trade designation Indofast Violet 23.

Semi-transparent, white spherical ceramic particles (extender) were obtained from 3M Company under the trade designation CM-111 Cosmetic Microspheres. The product is listed by the manufacturer as having a $50^{th}$ percentile particle size of approximately 5 microns.

Paint was obtained from Glidden under the trade designation Oil/Alkyd SemiGloss Paint, Ultrahide 3517.

NALCO 2326 silica nanoparticles were surface-modified with a mixture of isooctyltrimethoxy silane and methyltrimethoxy silane, according to the procedures outlined in U.S. Patent Application Ser. No. 61/220,698, entitled "Method of Milling Particles with Nanoparticles and Milled Free-flowing Powder. NALCO 2327 silica nanoparticles were likewise surface modified according to the procedures outlined in U.S. 61/220,698.

Surface-modified nanoparticles were wet blended with inorganic pigments by combining the desired amounts of dried, surface modified nanoparticles and pigments with toluene and mixing overnight either with agitation by a magnetic stir bar or by rolling in a jar. Certain samples were wet blended in an isopropanol/water mixture rather than in toluene, as noted. The mixtures were then dried in an aluminum pan and were exposed to 120° C. to ensure that the liquid was substantially removed. In various experiments, different weight ratios of nanoparticles to inorganic pigment particles were used, and are reported in the tables below as wt. % nanoparticles. Other materials (e.g., nanoparticles without surface modification, and fumed silica) were wet blended with the inorganic pigment in similar manner.

In various experiments, the visually perceived color and appearance of the dried, inorganic pigment with surface-modified nanoparticles were recorded. In other experiments, the dried, inorganic pigment with surface-modified nanoparticles was mixed with CM-111 extender, using a mixing device available from FlackTek, Landrum, S.C., under the trade designation SpeedMixer DAC 150 FVZ. In some cases a weight ratio of 10% inorganic pigment with surface-modified nanoparticles, to 90% CM-111 was used; in other cases, a weight ratio of 7.5% inorganic pigment with surface-modified nanoparticles, to 92.5% CM-111 was used, and in some cases a weight ratio of 1.0% inorganic pigment with surface-modified nanoparticles, to 99% CM-111 was used. Visually perceived color and appearance of the extended pigment mixture were recorded.

Optical color properties of the samples were also measured by use of a Hunter Lab D25A Optical Sensor (Hunter Associates, Reston, Va.). These measurements provided an L* value (of the well-known L*a*b* scale) which is known to those of ordinary skill in the art as a measure of the lightness or darkness of a sample on a scale of 1-100 (where a value of 1 is black and a value of 100 is white).

Flow properties of the samples were also visually observed, typically by observation of the tendency of each sample to flow under gravity.

In Table 1 are presented data for Iron Oxide Red pigment (WCD Red) with and without 5 nm surface-modified nanoparticles, extended with CM-111 at a ratio of 10% pigment to 90% CM-111, by weight.

TABLE 1

| Example # | Nanoparticles* (wt-% relative to pigment) | % Pigment/ % Extender | Visual Observations | L* Value |
|---|---|---|---|---|
| 1-1 | None | 10% pigment/ 90% extender | Caked with poor & clumpy flow | 54.0 |
| 1-2 | 0.5 wt. % | 10% pigment/ 90% extender | Darker, richer color and flow improved | 48.1 |

*Surface-modified NALCO 2326

In Table 2 are presented data for Ferric Ferrocyanide Blue pigment (WCD Blue) with and without 5 nm surface-modified nanoparticles, extended with CM-111 at a ratio of 10% pigment to 90% CM-111, by weight, and in the case of Example 2-3, at a ratio of 1.0% pigment to 99% CM-111, by weight.

TABLE 2

| Example # | Nanoparticles* (wt-% relative to pigment) | % Pigment/ % Extender | Visual Observations | L* Value |
|---|---|---|---|---|
| 2-1 | None | 10% pigment/ 90% extender | Not very homogeneous, caked, light colored | 64.0 |
| 2-2 | 0.5 wt. % | 10% pigment/ 90% extender | Richer color, more homogeneous, flow improved | 46.5 |
| 2-3 | 0.75 wt. % | 1.0% pigment/ 99% extender | Darker and more homogeneous | 68.4 |

*Surface-modified NALCO 2326

In Table 3 are presented data for Ferric. Ferrocyanide Blue pigment wet-blended with 5 nm surface-modified nanoparticles, extended with CM-111 at a ratio of 7.5% pigment to 92.5% CM-111 by weight, as a function of the wt. % nanoparticles (relative to the pigment weight). For comparison is shown a sample (3-1) of the same pigment extended at 10% pigment/90% extender, without nanoparticles. No improvement in flow properties was seen for any of the samples containing nanoparticles.

TABLE 3

| Example # | Nanoparticles* (wt-% relative to pigment) | % Pigment/ % Extender | Visual Observations | L* Value |
|---|---|---|---|---|
| 3-1 (same as 2-1) | None | 10% pigment/ 90% extender | Not very homogeneous, caked, light colored | 64.0 |
| 3-2 | 0.25 wt. % | 7.5% pigment/ 92.5% extender | Darker than control sample | 52.4 |
| 3-3 | 0.5 wt. % | 7.5% pigment/ 92.5% extender | Darker and more homogeneous than control | 58.2 |
| 3-4 | 0.75 wt. % | 7.5% Pigment/ 92.5% extender | Darkest and richest color, very homogeneous | 42.0 |
| 3-5 | 1.0 wt. % | 7.5% pigment/ 92.5% extender | Similar color to control | 64.4 |

TABLE 3-continued

| Example # | Nanoparticles* (wt-% relative to pigment) | % Pigment/ % Extender | Visual Observations | L* Value |
|---|---|---|---|---|

*Surface-modified NALCO 2326

In Table 4 are presented data for Iron Oxide Red pigment (3M Industrial Minerals Division) wet-blended with surface-modified nanoparticles of various sizes, with 5 nm nanoparticles without surface modification, and with fumed silica. All samples were extended with CM-111 at a ratio of 10% pigment to 90% CM-111 by weight. No improvement in flow properties was seen for any of the samples.

TABLE 4

| Example 3 | Additive type | Additive amount (wt-% relative to pigment) | Visual Observations | L* Value |
|---|---|---|---|---|
| 4-1 | None | None | Even throughout, clumpy | 48.0 |
| 4-2 | 5 nm nanoparticles, without surface modification* | 1.0 wt. % | Lighter in color, not homogeneous | 54.0 |
| 4-3 | 20 nm nanoparticles, with surface modification** | 1.0 wt. % | Homogeneous color, clumpy | 49.2 |
| 4-4 | Fumed silica*** | 1.0 wt. % | Homogeneous color, clumpy | 49.0 |

*NALCO 2326, unmodified, wet blended with pigment in isopropanol/water
**NALCO 2327
***(Cab-O-Sil CT-1221)

Example 5

NALCO 2326 silica nanoparticles were surface-modified with a mixture of isooctyltrimethoxy silane and methyltrimethoxy silane as outlined above. The surface-modified nanoparticles were wet-blended with Ferric Ferrocyanide Blue pigment as outlined above, to provide 0.5 wt % surface-modified nanoparticles relative to the inorganic pigment. 0.60 g of the nanoparticle-enhanced inorganic pigment composition was added in 0.15 g increments to 18.25 g of Glidden Oil/Alkyd Paint Ultrahide 3517 with the mixture being stirred with an applicator stick after each incremental addition, thus providing a paint formulation to which 3.2% by weight of the nanoparticle-enhanced pigment composition had been added (based on the total wet weight of the paint). A similar sample was prepared in which the inorganic pigment was added to the paint to 3.2% by weight, but in which the pigment did not comprise nanoparticles. Each sample was then rolled in a vial for approximately two hours, with each vial containing a stirrer bar to provide additional mixing.

A paintbrush was then used to smear a small amount of each paint sample onto a glass slide. The painted samples were then allowed to dry. Visual inspection revealed that the paint sample with the nanoparticle-enhanced inorganic pigment composition displayed a noticeably more pronounced and more uniform blue color than the sample without nanoparticles.

Example 6

NALCO 2326 silica nanoparticles were surface-modified with a mixture of isooctyltrimethoxy silane and methyltrimethoxy silane as outlined above. The surface-modified nanoparticles were wet-blended with an organic pigment (available under the trade designation Indofast Violet 23 from Sun Chemical, Cincinnati, Ohio), in similar manner as outlined above, to provide 0.5 wt % surface-modified nanoparticles relative to the organic pigment. The organic pigment with surface-modified nanoparticles was mixed with CM-111 extender in similar manner as outlined above, using a mixing device available from FlackTek, Landrum, S.C., under the trade designation SpeedMixer DAC 150 FVZ, at a weight ratio of 10% organic pigment with surface-modified nanoparticles, to 90% CM-111. The 90/10 mixture of CM-111 extender/organic pigment with surface-modified nanoparticles exhibited an L* value of 38.3. A 90/10 mixture of CM-111 extender/organic pigment without surface-modified nanoparticles, exhibited an L* value of 23.0. Compared to the 90/10 extender-mixed sample without surface-modified nanoparticles, the 90/10 extender-mixed sample with surface-modified nanoparticles appeared lighter in color with dark specs.

The tests and test results described above are intended solely to be illustrative, rather than predictive, and variations in the testing procedure can be expected to yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

What is claimed is:

1. A method of preparing a nanoparticle-enhanced inorganic pigment composition, comprising:
   providing a plurality of inorganic pigment particles;
   mixing the plurality of inorganic pigment particles with a plurality of surface-modified nanoparticles so that the plurality of surface-modified nanoparticles forms at least a monolayer upon at least a portion of the surface of at least some of the inorganic pigment particles; and,
   further comprising a step of mixing the nanoparticle-enhanced inorganic pigment composition with an inorganic extender at at least a 2:1 weight ratio of extender to pigment to form an admixture.

2. The method of claim 1 wherein the mixing of the plurality of inorganic pigment particles with the plurality of surface-modified nanoparticles is performed by a wet blending process in which the inorganic pigment particles and the surface-modified nanoparticles are added to a liquid and mixed.

3. The method of claim 2 wherein the liquid is removed after the mixing process.

4. The method of claim 1 wherein the nanoparticles comprise an average primary particle size of less than about 10 nanometers.

5. The method of claim 1 wherein the nanoparticle-enhanced inorganic pigment composition exhibits an L* value that is at least 5 units lower than the L* value of the same inorganic pigment not mixed with the plurality of surface-modified nanoparticles.

6. The method of claim 1 further comprising the step of mixing the admixture with a vehicle.

7. The method of claim 1 wherein the admixture exhibits an L* value that is at least 5 units lower than the L value of an admixture containing inorganic pigment and extender at the same ratio but not containing surface-modified nanoparticles.

8. A nanoparticle-enhanced inorganic pigment composition, comprising:
   a plurality of inorganic pigment particles;

a plurality of surface-modified nanoparticles forming at least a monolayer upon at least a portion of the surface of at least some of the inorganic pigment particles; and,
further comprising a plurality of extender particles present at least at a 2:1 weight ratio of extender to pigment so that the composition is present as an admixture.

9. The nanoparticle-enhanced inorganic pigment composition of claim 8, wherein the surface-modified nanoparticles comprise an average primary particle size of less than about 10 nanometers.

10. The nanoparticle-enhanced inorganic pigment composition of claim 8, wherein the weight ratio of surface-modified nanoparticles to inorganic pigment particles is from about 0.25% to about 1.0%.

11. The nanoparticle-enhanced inorganic pigment composition of claim 8, wherein the weight ratio of surface-modified nanoparticles to inorganic pigment particles is from about 0.50% to about 0.75%.

12. The nanoparticle-enhanced inorganic pigment composition of claim 8, wherein the surface-modified nanoparticles comprise hydrocarbon groups that are covalently bonded to the nanoparticles.

13. The nanoparticle-enhanced inorganic pigment composition of claim 8 wherein the admixture exhibits an L* value that is at least 5 units lower than the L value of an admixture containing inorganic pigment and extender at the same ratio but not containing surface-modified nanoparticles.

14. The nanoparticle-enhanced inorganic pigment composition of claim 8 wherein the admixture exhibits an L* value that is at least 10 units lower than the L value of an admixture containing inorganic pigment and extender at the same ratio but not containing surface-modified nanoparticles.

15. The nanoparticle-enhanced inorganic pigment composition of claim 8 wherein the extender particles are chosen from the group consisting of glass bubbles, ceramic microspheres, calcium carbonate, titanium dioxide, barium sulfate, talc, clay, diatomaceous earth, lime, silica, aluminosilicates, mica, and combinations thereof.

16. The nanoparticle-enhanced inorganic pigment composition of claim 8 wherein the surface-modified nanoparticles comprise an inorganic oxide material.

17. The nanoparticle-enhanced inorganic pigment composition of claim 8 wherein the inorganic pigment is chosen from the group consisting of metal oxides, metal cyanides, metal sulfides, metal silicates, and combinations thereof.

* * * * *

UNITED STATES PATENT AND TRADEMARK OFFICE
CERTIFICATE OF CORRECTION

PATENT NO. : 9,067,782 B2
APPLICATION NO. : 13/510122
DATED : June 30, 2015
INVENTOR(S) : Jimmie Baran It is certified that error appears in the above-identified patent and that said Letters Patent is hereby corrected as shown below:

Specification

Column 4
Line 2, Delete "vinyltriisopropoxysilanc," and insert -- vinyltriisopropoxysilane, --, therefor.

Column 4
Line 37, Delete "ethox y]" and insert -- ethoxy] --, therefor.

Column 4
Line 53, Delete "arc" and insert -- are --, therefor.

Column 11
Line 19, Delete "Example 3" and insert -- Example # --, therefor.

Signed and Sealed this
Twelfth Day of April, 2016

Michelle K. Lee
*Director of the United States Patent and Trademark Office*